No. 782,483. PATENTED FEB. 14, 1905.
W. H. CAMMEYER.
PRODUCTION OF UNDERCUT TILES.
APPLICATION FILED AUG. 10, 1904.
2 SHEETS—SHEET 1.
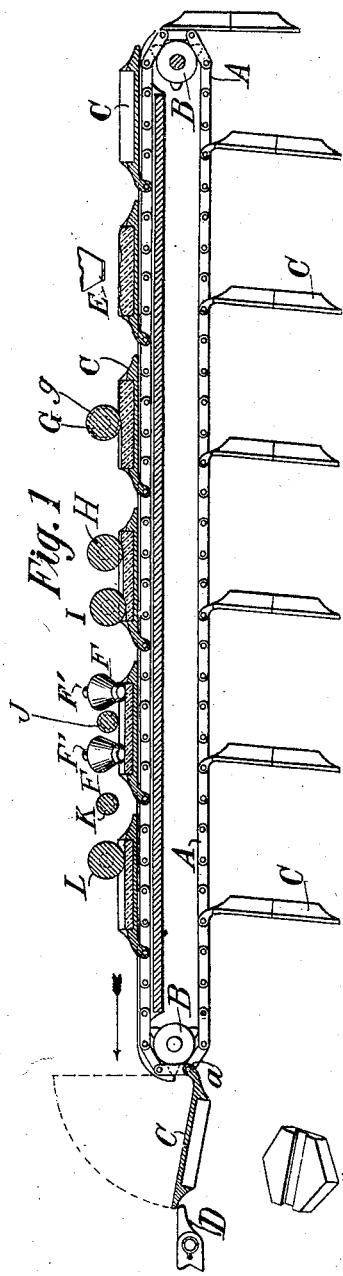
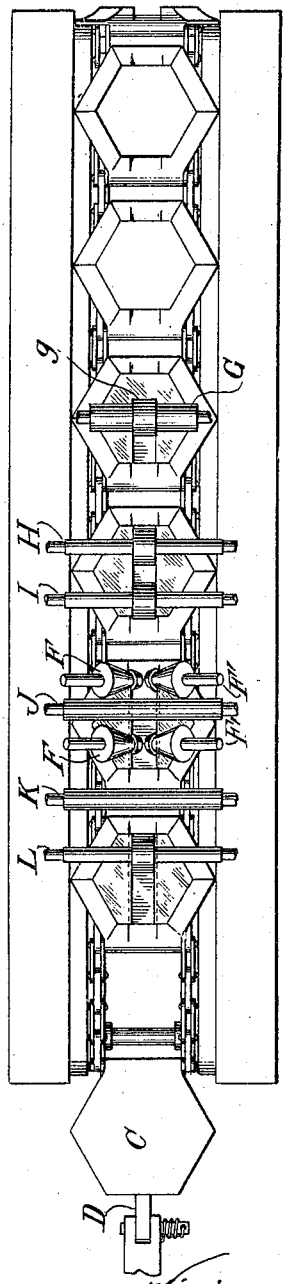
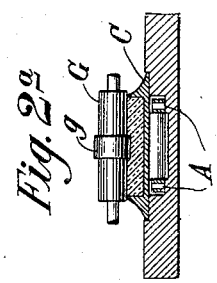

No. 782,483. PATENTED FEB. 14, 1905.
W. H. CAMMEYER.
PRODUCTION OF UNDERCUT TILES.
APPLICATION FILED AUG. 10, 1904.
2 SHEETS—SHEET 2.
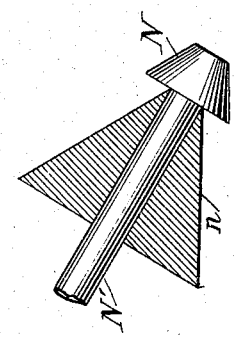
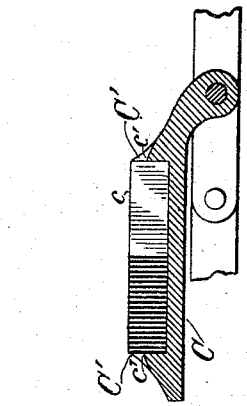
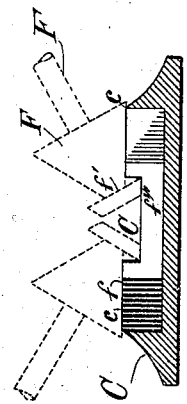
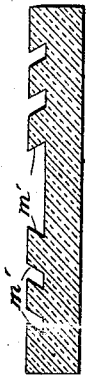
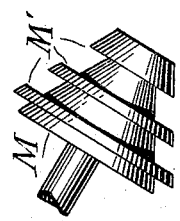
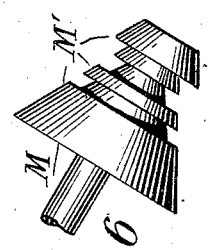
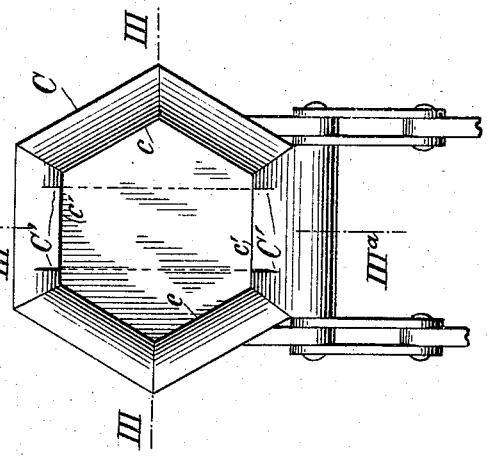
Witnesses
Raphael Netter
Wm. B. Kerkam
Inventor
William H. Cammeyer,
by Mauro, Cameron, Lewis & Massie
Att'ys.

No. 782,483. Patented February 14, 1905.

UNITED STATES PATENT OFFICE.

WILLIAM H. CAMMEYER, OF MONTVILLE, NEW JERSEY.

PRODUCTION OF UNDERCUT TILES.

SPECIFICATION forming part of Letters Patent No. 782,483, dated February 14, 1905.

Application filed August 10, 1904. Serial No. 220,266.

*To all whom it may concern:*

Be it known that I, WILLIAM H. CAMMEYER, a citizen of the United States, and a resident of Montville, Morris county, New Jersey, (whose post-office address is Montville, Morris county, New Jersey,) have invented a new and useful Improvement in the Production of Undercut Tiles, which is fully set forth in the following specification.

My invention relates to the production of undercut tiles; and it consists in the apparatus and arrangement hereinafter set forth and in the manner of using the same.

The invention consists, broadly, in subjecting one or more molds containing suitable composition to the successive action of a number of rollers which produce the undercut and in details to be set forth and claimed.

The invention will best be understood by reference to the accompanying drawings, that illustrate one embodiment thereof.

In the drawings, Figure 1 is a side view representing an endless chain carrying the molds beneath the rollers. Fig. 2 is diagrammatic view indicating the arrangement of the rollers. Fig. $2^a$ is a vertical cross-section through Figs. 1 and 2 at roller G. Fig. $2^b$ is a similar view through a mold, showing a modified form of roller. Figs. 3 and $3^a$ show a preferred form of mold in section, taken through lines III III and $III^a III^a$, respectively, of Fig. 4. Fig. 4 is a plan view of the same. Figs. 5, 6, and 7 illustrate details of modifications; and Figs. 8 and 9 are transverse sections of different forms of tile.

An endless chain A is caused to travel around drums B B in the direction indicated by the arrow by any convenient mechanism. A plurality of molds C is attached to this endless chain, being hinged at their forward ends. The travel of the endless chain carries these molds, with their contents, beneath the rollers, and at the end of the travel when each mold has passed all the rollers and reaches the drum B and as its point of connection to the chain at $a$ begins to pass down the side of the drum B the mold is thrown upward and inverted, whereupon it strikes a (yielding) ledge D with a smart tap, which discharges the tile from the mold. Thereafter the emptied mold passes beneath the apparatus, hanging downward until its return to position at the other end of the course, when it is again filled with material, as from a spout E. The mold C, here shown as a regular hexagon, is provided with a sharp ridge or knife-edge $c$, extending all round its periphery, except at the portions $C'' C'$, where it is broken away, as seen; but the portions $C' C'$ are also constructed with knife-edges $c'$.

The roller F, that forms the undercut, is preferably shaped and mounted as shown in broken lines in Fig. 3, comprising a plurality of frusto-conical portions. Its shaft $F'$ is inclined at an angle, so that the lower side of its shoulder $f$ shall be horizontal, while the adjacent shoulder $f'$ shall be inclined to the horizon at an angle less than a right angle, so as to outline the side of the undercut in the tile. The lower face $f''$ of the head of roller F is likewise by preference presented is a horizontal position, as seen in the drawings. In practice there will be one of these rollers on each side, either both in the same plane (transversely to the endless chain) or one roller slightly in advance of the other. As the mold containing the material is passed underneath the rollers F each roller would outline an undercut. However, in practice I prefer first to pass the mold under a roller G, carrying a flange $g$, which is just wide enough and deep enough to outline the vertical portion of the seat in the tile. Immediately after leaving the roller G the mold and its contents may be passed under the inclined rollers F, which will then produce the cross-section or undercut portions in the tile. However, in practice I find it desirable to cause a succession of rollers H I J K L to pass over the material of the tile to prevent it from flowing or creeping back from the position into which it has been forced by the forming-rollers G and F.

Instead of having a roller F to produce a single undercut I may provide rollers, as M, having a plurality of flanges $M'$ to produce a plurality of undercuts $m'$, or there may be one or more annular recesses on the roller, as $M''$, to produce one or more inclined ridges $m''$ on the tile. Again, instead of having each roller made unitary there may be a smaller head N, rigid on the driving-shaft N' and carrying a separate shoulder-piece n, which is driven solely by its friction upon the shaft. All of these rollers are driven so that their bottoms revolve in the same direction that the molds travel, so that the action of each roller on the material of the tile serves to squeeze it downward. The result of this continuous squeezing action of the successive rollers is to produce a tempered and case-hardened tile and to produce an undercut tile having its undercut portion and its adjacent face thus case-hardened.

If preferred, instead of driving the rollers positively they may be caused to revolve by the passing beneath them of the material in the molds, which produces the same results, or instead of driving the endless chain A by positive mechanism the revolution of the rollers may be relied on (like rollers in a rolling-mill) to draw the molds through.

Instead of rollers F presented at an angle I may employ rollers at the lower end of vertical shafts, frusto-conical in shape, to produce the undercut. (See Fig. 2$^b$.) A single roller whose diametrical cross-section outlines the cross-section of the undercut substantially suffices to embody the spirit of my invention; but it is better to employ only such roller for each side of the undercut, the roller revolving in the same direction as the mold with its contents, but, better still, a plurality of such rollers on each side.

I do not limit myself to the precise construction and arrangements shown or to the employment of all the rollers set forth. The spirit of my invention consists in producing an undercut in the tile by means of the squeezing action of the rollers, also in thus case-hardening the tiles, also in presenting a plurality of molds to the successive action of these rollers, as by an endless chain, and also in the manner of filling the molds and emptying the same after the tile has been completed.

Parts of the invention may be used to the exclusion of other parts without departing from the spirit of the invention.

Having thus described my invention, I claim—

1. In tile-making apparatus, the combination of a suitable mold having two seats in its wall, one on each side thereof, a plurality of rollers adapted to pass through said seats, and means for causing the mold to pass beneath said rollers, for the purpose described.

2. A mold for producing undercut tiles, having a knife-edge around its periphery, and having in its side wall two oppositely-disposed seats each seat having a knife-edge.

3. In a tile-forming apparatus, an endless chain, a mold hinged thereto at its forward end, and one or more rollers under which said mold passes to compress the tile within said mold.

4. In a tile-forming apparatus, an endless chain passing in a horizontal direction around two drums, a plurality of molds hinged thereto at their forward ends, a plurality of rollers under which said molds travel to produce the tile therein, and located in front of the forward drum a suitable ledge or stop against which the free end of said mold impinges.

5. The herein-described roller for producing an undercut in a tile, the same having one revoluble surface presented at less than a right angle to the horizon and another revoluble surface presented horizontally.

6. A tile-forming apparatus comprising the combination of a suitable mold having two oppositely-located seats or embrasures, a roller presenting a revoluble surface horizontally and another revoluble surface at an angle, and means for causing relative movement of said roller through said seats.

7. A tile-forming apparatus comprising a plurality of molds each having two oppositely-disposed seats or embrasures and provided with a knife-edge around its periphery, in combination with a series of rollers adapted to pass successively through said seats, the said rollers comprising a cylindrical roll adapted to contact with the main portion of the top of said molds and having an annular flange adapted to pass through the seats of said molds, and an inclined roller having a revoluble surface presented horizontally and another revoluble surface presented at an angle and adapted to outline an undercut in the tile.

8. The process of producing an undercut in a tile, which consists of a succession of steps of squeezing the material downward and forward while forcing it into the proper shape, substantially as described.

9. The process of producing an undercut in a tile which consists of first forming a straight-sided groove in the upper face of the material, and then widening said groove at its lower portion while making it narrower at its top, substantially as described.

10. The herein-described roller for producing an undercut in tiles, the same comprising a plurality of frusto-conical portions.

In testimony whereof I have signed this specification in the presence of two subscribing witnesses.

WILLIAM H. CAMMEYER.

Witnesses:
C. A. L. MASSIE,
R. L. SCOTT.